(12) United States Patent
Litvova et al.

(10) Patent No.: US 11,393,343 B2
(45) Date of Patent: Jul. 19, 2022

(54) SYSTEM AND METHOD FOR ENABLING AUTOMATIC DIVERSION MANAGEMENT

(71) Applicant: HONEYWELL INTERNATIONAL INC., Morris Plains, NJ (US)

(72) Inventors: Monika Litvova, Zilinsky kraj (CZ); Zdenek Jancik, Jihomoravsky kraj (CZ); Dorothee De Villele, Haute-Garonne (FR); Rajesh Chaubey, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 469 days.

(21) Appl. No.: 16/286,792

(22) Filed: Feb. 27, 2019

(65) Prior Publication Data
US 2020/0273350 A1  Aug. 27, 2020

(51) Int. Cl.
  *G08G 5/00*   (2006.01)
  *B64D 43/00*  (2006.01)

(52) U.S. Cl.
  CPC ......... *G08G 5/0039* (2013.01); *B64D 43/00* (2013.01); *G08G 5/0013* (2013.01); *G08G 5/0056* (2013.01); *G08G 5/0091* (2013.01)

(58) Field of Classification Search
  CPC .. G08G 5/0039; G08G 5/0013; G08G 5/0056; G08G 5/0091; G08G 5/0021; G08G 5/025; B64D 43/00
  See application file for complete search history.

(56) References Cited

U.S. PATENT DOCUMENTS

| | | | |
|---|---|---|---|
| 8,723,686 B1 | 5/2014 | Murray et al. | |
| 2008/0300737 A1 | 12/2008 | Sacle et al. | |
| 2011/0196564 A1* | 8/2011 | Coulmeau | G08G 5/0039 701/26 |
| 2014/0309821 A1* | 10/2014 | Poux | B64D 45/00 701/14 |
| 2016/0057032 A1* | 2/2016 | Tieftrunk | G08G 5/0013 701/533 |

(Continued)

FOREIGN PATENT DOCUMENTS

| | | |
|---|---|---|
| EP | 0743580 A1 | 11/1996 |
| EP | 2077437 A2 | 7/2009 |

*Primary Examiner* — Aniss Chad
*Assistant Examiner* — Chase L Cooley
(74) *Attorney, Agent, or Firm* — Lorenz & Kopf, LLP

(57) ABSTRACT

An automatic diversion management system on-board an aircraft is provided. The diversion management system is configured to automatically detect a need for the aircraft to divert from a primary airport to a diversion airport; automatically initiate diversion planning to a suitable diversion airport responsive to detecting conditions that can cause a need for diversion; automatically create a diversion flight plan; automatically send a clearance request to air traffic control (ATC) for a first type of conditions causing a need for diversion and send a clearance request to ATC, responsive to flight crew action, for a second type of conditions causing a need for diversion; and automatically activate the diversion flight plan after receipt of ATC clearance for the first type of conditions causing a need for diversion and activate the diversion flight plan, responsive to flight crew action, for the second type of conditions causing a need for diversion.

18 Claims, 10 Drawing Sheets

(56) References Cited

U.S. PATENT DOCUMENTS

| | | |
|---|---|---|
| 2016/0125744 A1* | 5/2016 | Shamasundar ...... G08G 5/0039 701/122 |
| 2017/0229024 A1 | 8/2017 | Moravek et al. |
| 2017/0243495 A1 | 8/2017 | Moravek et al. |
| 2018/0068569 A1 | 3/2018 | Chmelarova et al. |
| 2018/0144643 A1 | 5/2018 | Moravek et al. |

* cited by examiner

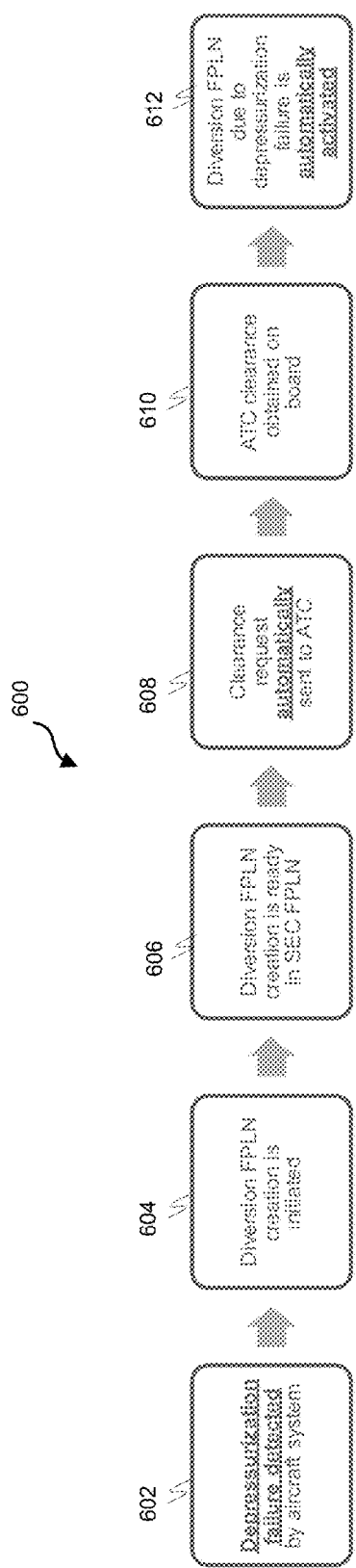
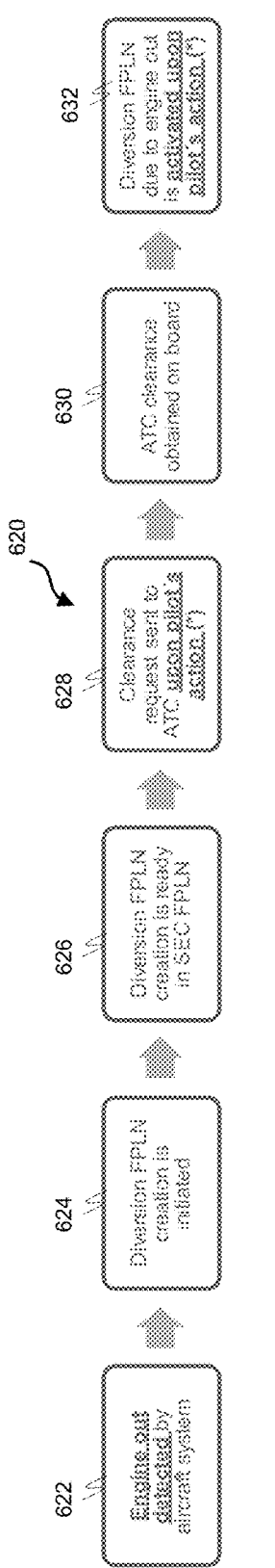
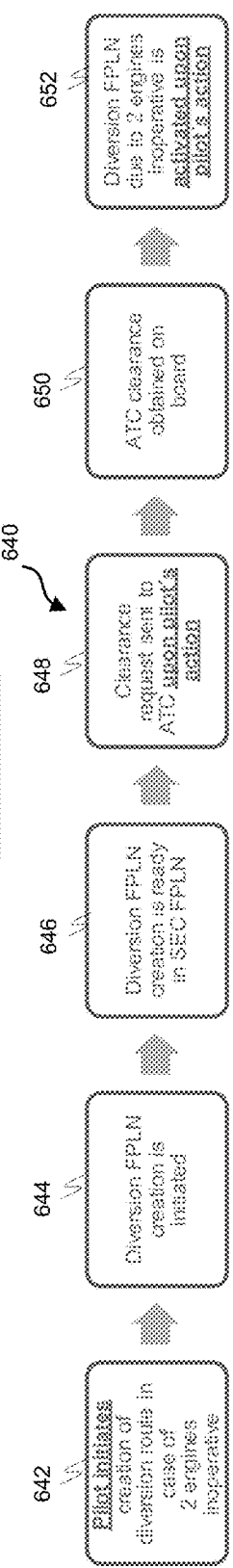
FIG. 6A
FIG. 6B
FIG. 6C

SYSTEM AND METHOD FOR ENABLING AUTOMATIC DIVERSION MANAGEMENT

TECHNICAL FIELD

The present invention generally relates to safety systems during flight, and more particularly relates to a system and method for automatic diversion management.

BACKGROUND

Flight diversion management can significantly increase a flight crew's workload. When diversion toward the same destination airport is needed, for example due to weather, the flight crew must, among other things, select a new route, enter the new route into the flight management system (FMS), and obtain air traffic control (ATC) clearance before activating the new route. When diverting to a new destination airport (i.e., diversion airport) the flight crew, among other things, has to balance selection criteria to select an appropriate airport amongst the closest airports and has to string a route together to reach the diversion airport. The need for diversion can result from different causes—bad weather at the destination, depressurization, inoperative engine, fire, medical emergency and many more. Many of these causes can result in emergency conditions, which can increase the flight crew's workload tremendously. In the context of reduced crew or single pilot operations (SPO), a diversion need could be coupled with pilot incapacitation. Current on-board systems do not automatically manage diversion tasks.

Hence, it is desirable to have a system that can automatically manage diversion tasks. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an automatic diversion management system on-board an aircraft is provided. The diversion management system includes one or more processors configured by programming instructions on non-transient computer readable media. The diversion management system is configured to automatically detect a need for the aircraft to divert from a primary airport to a diversion airport; automatically initiate diversion planning to a suitable diversion airport responsive to detecting conditions that can cause a need for diversion; automatically create a diversion flight plan; automatically send a clearance request to air traffic control (ATC) for a first type of conditions causing a need for diversion and send a clearance request to ATC, responsive to flight crew action, for a second type of conditions causing a need for diversion; and automatically activate the diversion flight plan after receipt of ATC clearance for the first type of conditions causing a need for diversion and activate the diversion flight plan, responsive to flight crew action, for the second type of conditions causing a need for diversion.

In another embodiment, a processor-implemented method in an aircraft for automatic diversion management is provided. The method includes: recognizing, by a processor in the aircraft, a need for the aircraft to divert from a primary airport to a diversion airport; identifying, by the processor, potential diversion airports from both approved alternate airports and airports nearby the aircraft surrounding the original flight plan; providing, by the processor for a selected diversion airport from the potential diversion airports, an automatic re-routing selection option and a control descent and stable landing (CD&SL) point determination option; providing, by the processor, an option for ground flight control inputs from air traffic control (ATC) or ground assistant to initiate re-routing; and generating, by the processor, a DEST-APPR-STAR (destination, approach, standard arrival route) trajectory for re-routing to the selected diversion airport.

In another embodiment, a diversion management system on-board an aircraft is provided. The diversion management system is configured to: identify potential diversion airports when a need for diversion from a primary airport to a diversion airport has been recognized, provide, for a selected diversion airport from the potential diversion airports, an automatic re-routing selection option and a control descent and stable landing (CD&SL) point determination option; provide an option for ground flight control inputs from air traffic control (ATC) or ground assistant to initiate re-routing; and generate a DEST-APPR-STAR (destination, approach, standard arrival route) trajectory for re-routing to the selected diversion airport.

In another embodiment, a diversion airport search engine for use off-board an aircraft is provided. The search engine is configured to: receive a selection of a type of diversion airport needed and a type of aircraft; select suitable airports for diversion based on a current aircraft flight path, type of diversion airport needed, type of aircraft and an evaluation of selection criterion, the selection criterion including the cause of diversion, distance threshold that must not be exceeded for a potential diversion airport, available runway type at potential diversion airport, runway length at potential diversion airport, navigation aids at potential diversion airport, approach type at potential diversion airport, arrival procedure definition at potential diversion airport, route conflict or free route to potential diversion airport, and estimation of landing weight versus jettison gross weight at potential diversion airport; and display on a user interface (UI) a map that includes the current aircraft flight plan and icons representative of all suitable airports, wherein each icon for a suitable airport is selectable to display information regarding the airport that is useful for selecting the most suitable airport for diversion.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 6A, 6B and 6C are process flow charts depicting example processes in an example diversion management system for automating the diversion approval process with ATC, in accordance with some embodiments;

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for automatic diversion management. The apparatus, systems, techniques and articles provided can help enable reduced crew or single pilot (RCO/SPO) operations and reduce crew workload during diversion scenarios.

Figure 1A:
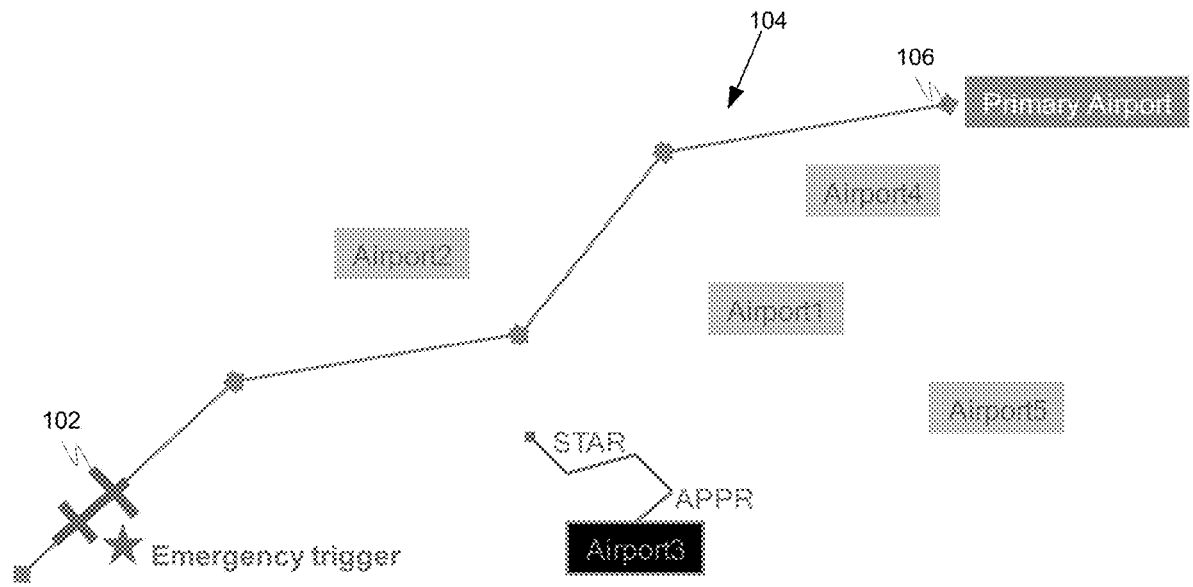
FIGS. 1A and 1B are diagrams depicting an example scenario for which automatic diversion management is useful, in accordance with some embodiments.
Figure 1B:
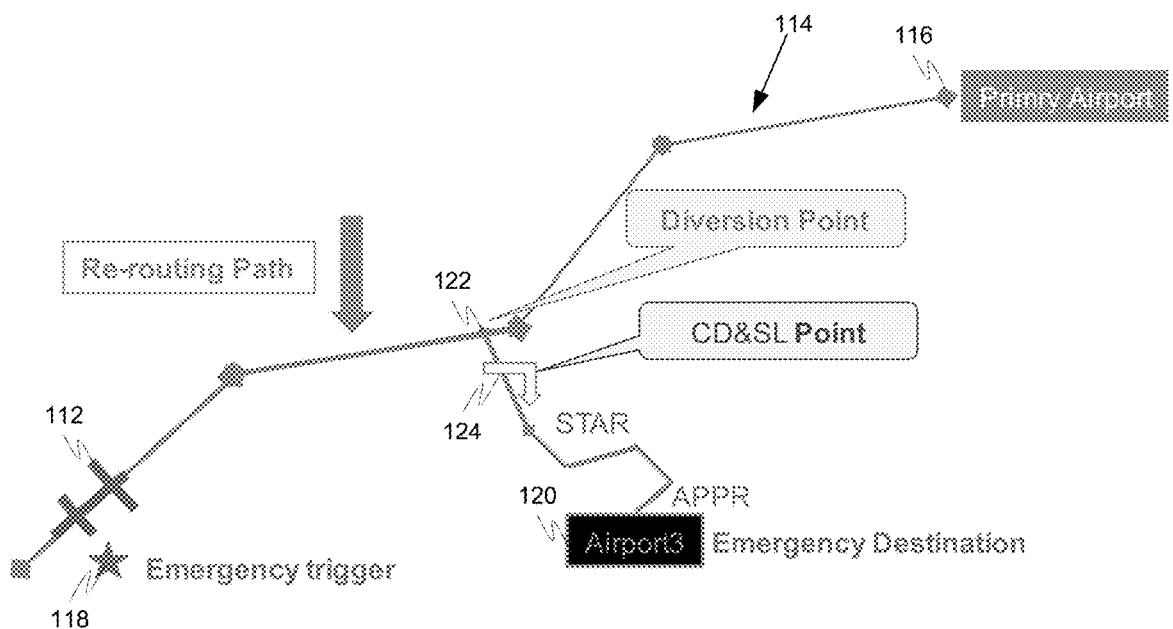

FIGS. 1A and 1B are diagrams depicting an example scenario for which automatic diversion management is useful. FIG. 1A depicts an example aircraft 102 that is flying in a managed mode along a flight path 104 toward a primary airport 106. In this example, the example aircraft 102 is operating with reduced crew or single pilot operations (RCO/SPO) and the pilot is healthy.

FIG. 1B depicts an example aircraft 112 that is flying in a managed mode along a flight path 114 toward a primary airport 116. In the example of FIG. 1B, the example aircraft 112 is operating with RCO/SPO and the pilot becomes incapacitated. An automatic diversion management system in the example aircraft 112 can sense an emergency trigger 118 (e.g., pilot incapacitation) and initiate diversion. The example automatic diversion management system is configured to determine the landing possibility at nearby airports, identify a diversion airport 120 from the nearby airports, select a diversion point 122 re-route the aircraft toward the diversion airport 120 beginning at the diversion point 122, select a control descent and stable landing (CD&SL) point 124, and manage aircraft CD&SL. In this example, a diversion point 122 is a point at which the aircraft 112 would have to divert from its current flight plan 114 for safe landing at the diversion airport 120. In this example, the CD&SL point 124 is the closest point backward from the new destination 120 where the aircraft 112 should initiate descent.

To manage CD&SL, a number of strategies may be employed to connect the aircraft to the CD&SL, such as considering a standard arrival route (STAR) entry or ground station specified route, automatic diversion management system generated routes, and/or crew specified routes. The choice of strategy could be given to the pilot, a ground assistant or the automatic diversion management system to select the most suitable route depending on the current aircraft state and the cause of the diversion.

When selecting routes, the example automatic diversion management system is configured to consider inputs such as the cause of the diversion (which could also include severity criterion), the current aircraft state (e.g., lat/long, altitude, heading, fuel on board (FOB), gross weight (GW)), and the current flight segment (flight phase & speeds).

The example automatic diversion management system is configured to consider various strategies such as re-pressurization descent (i.e., shortest time to reach pressurization altitude); extended operations (ETOPS) route guidelines; shortest distance to CD&SL point; shortest time to CD&SL point (e.g., wind consideration and capability to fly at high speeds); obstacles avoidance (e.g., terrain or weather, including minimum off-route altitude (MORA) consideration), aircraft energy consideration (e.g., path stretching and/or automatic holding pattern insertion if needed to dissipate energy and be able to land at the closest airport); aircraft gross weight consideration (e.g., jettison GW)—which could involve maintaining cruise as much as possible and/or inclusion of holding pattern if needed to burn fuel; flight efficiency consideration; conflict/traffic consideration (e.g., use of automatic dependent surveillance—broadcast (ADS-B)); free route airspace consideration; and maximum bank angle to leverage turn distance/time for course change>course change threshold (typical value: 180 deg).

The example automatic diversion management system is configured to implement a strategy, and once the strategy is selected, determine a diversion point. The diversion point could be at the current aircraft location.

Figure 2:
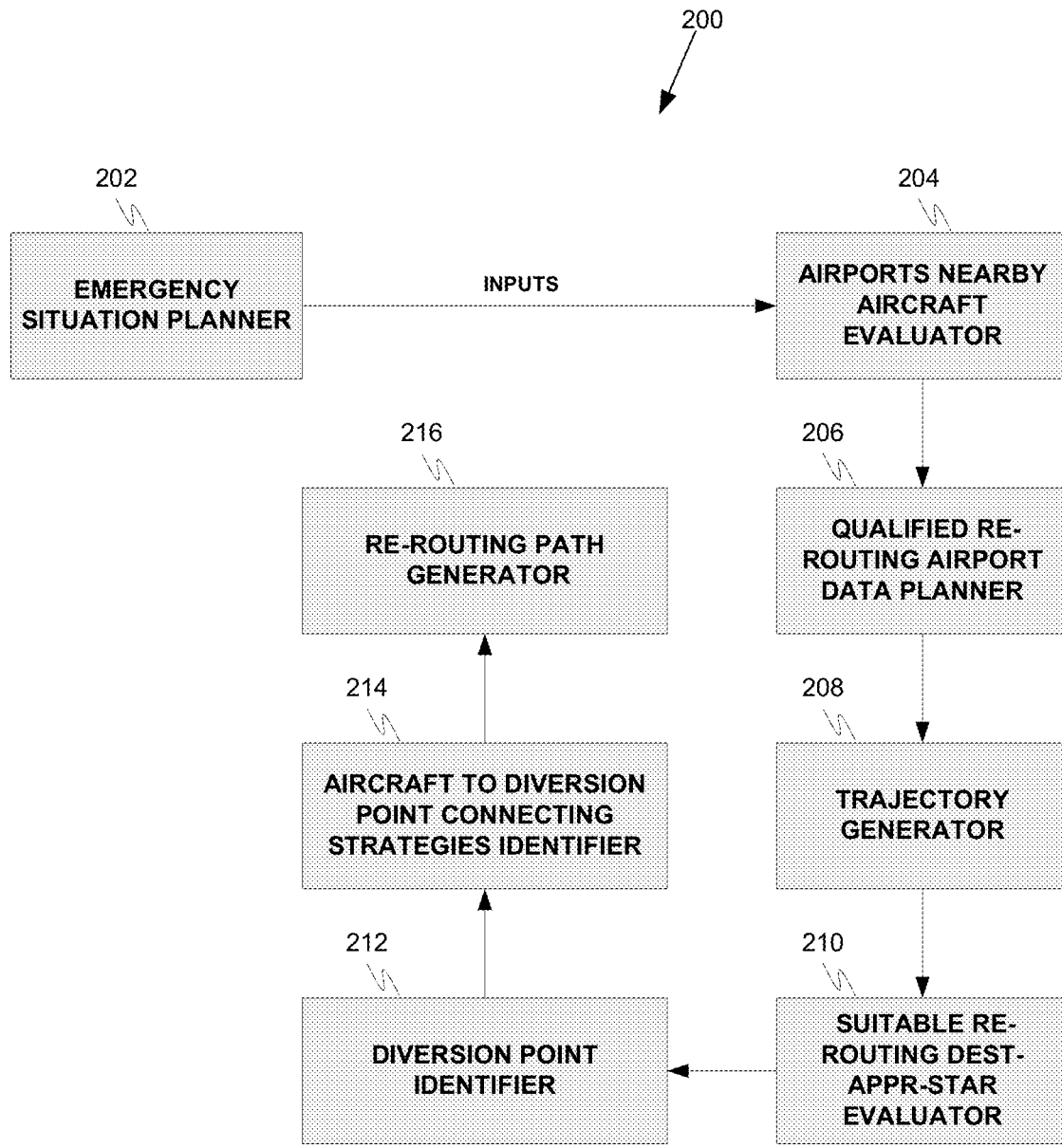
FIG. 2 is a is a block diagram depicting an example automatic diversion management system, in accordance with some embodiments.

FIG. 2 is a block diagram depicting an example automatic diversion management system 200. The example automatic diversion management system 200 includes an emergency situation planner 202, a diversion airport evaluator 204, a qualified re-routing airport data planner 206, a trajectory generator 208, a suitable re-routing DEST-APPR-STAR evaluator 210, a diversion point identifier 212, an aircraft to diversion point connecting strategies identifier 214, and a re-routing path generator 216.

The example automatic diversion management system 200 includes a controller that is configured to implement the emergency situation planner 202, the diversion airport evaluator 204, the qualified re-routing airport data planner 206, the trajectory generator 208, the suitable re-routing DEST-APPR-STAR evaluator 210, the diversion point identifier 212, the aircraft to diversion point connecting strategies identifier 214, and the re-routing path generator 216. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The emergency situation planner 202 is configured to detect a need for a diversion. Types of conditions that may cause a need for diversion includes safety of flight conditions, an operational condition, or a service related condition. Examples of safety of flight conditions include pilot incapacitation (especially for RCO/SPO), fire, smoke, major mechanical failure, natural disaster, and security. Examples of operational conditions include fuel (e.g., over burn or leak), ETOPS, weather at destination, ATC system constraint (e.g., required holding pattern), or runway obstruction. Examples of service related conditions include a medical need of a passenger or an unruly passenger.

The diversion airport evaluator 204 is configured to evaluate various airports nearby the flight path of the airplane requiring diversion to identify the airports that may serve as a possible new destination for landing. The qualified re-routing airport data planner 206 is configured to apply new destination selection criterion to identify an airport out of the possible destination airports as the diversion airport. The trajectory generator 208 is configured to generate a DEST-APPR-STAR trajectory to the selected diversion airport. The suitable re-routing DEST-APPR-STAR evaluator 210 is configured to apply selection criteria to determine if the generated DEST-APPR-STAR trajectory is suitable. The diversion point identifier 212 is configured to identify a diversion point based on the DEST-APPR-STAR trajectory. The aircraft to diversion point connecting strategies identifier 214 is configured to evaluate strategies for connecting the aircraft to the diversion point. The re-routing path generator 216 is configured to generate and store a secondary flight plan that connects the aircraft to the diversion point and a CD&SL point.

Figure 3:
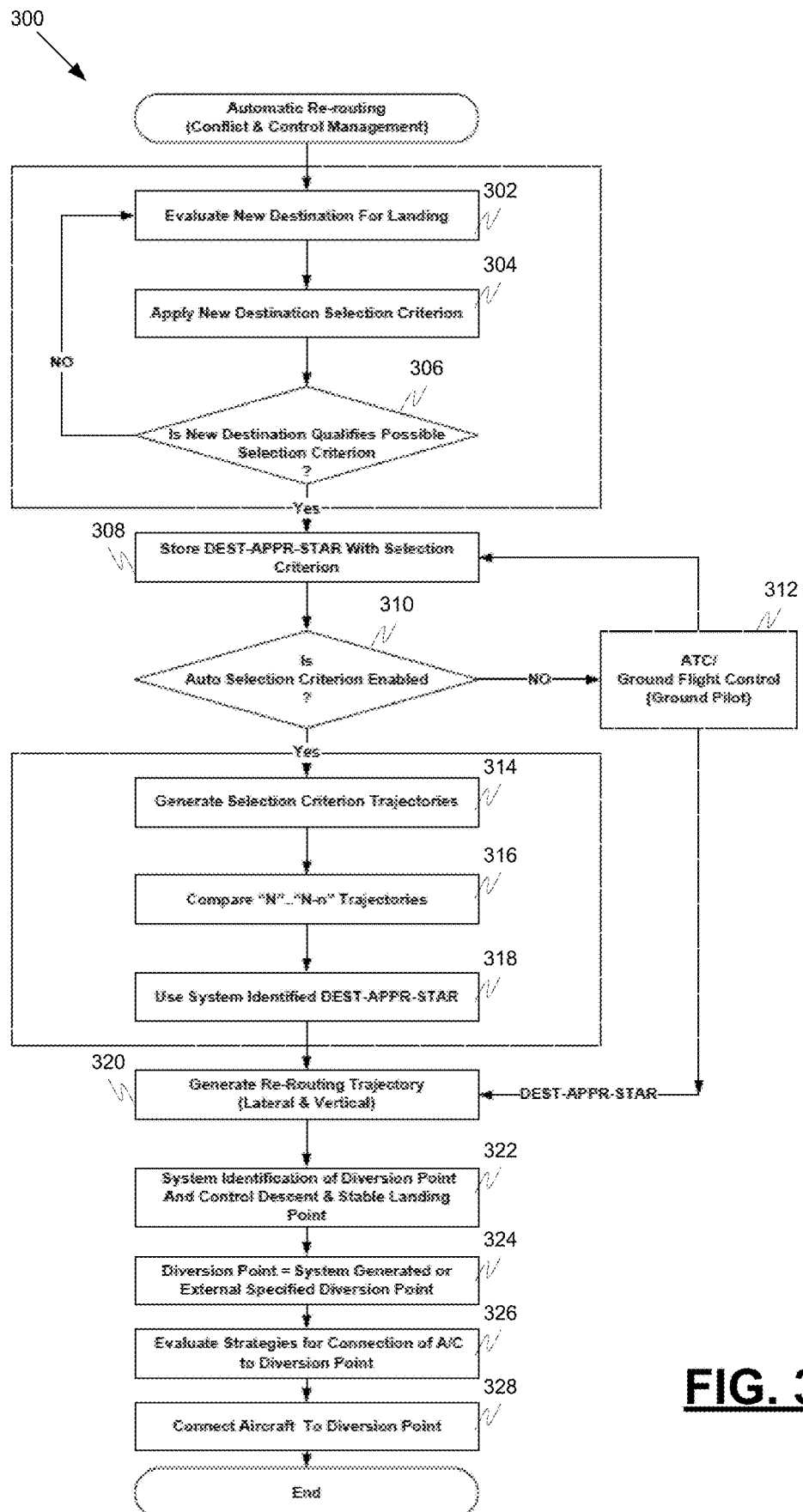
FIG. 3 is a process flow chart depicting an example process in an automatic diversion management system, in accordance with some embodiments.

FIG. 3 is a process flow chart depicting an example process 300 in an automatic diversion management system. The example process 300 includes evaluating new potential destinations for landing (operation 302); applying new destination selection criterion (operation 304); and determining if a potential new destination qualifies as a diversion airport using the selection criterion (decision 306). If the potential new destination does not qualify as a diversion airport using the selection criterion (no at decision 306), the example process 300 then includes evaluating a new destination for landing (operation 302). If the potential new destination does qualify as a diversion airport using the selection criterion (yes at decision 306), the example process 300 then includes generating and storing a DEST-APPR-STAR trajectory to the diversion airport (operation 308).

The example process 300 includes determining if auto selection criterion is enabled (decision 310). If auto selection criterion is not enabled (no at decision 310), then the example process 300 includes using ATC/Ground Flight Control (e.g., Ground Pilot) selection of a DEST-APPR-STAR trajectory (operation 312) and storing the ATC/Ground Flight Control selected DEST-APPR-STAR trajectory to the diversion airport (operation 308). If auto selection criterion is enabled (yes at decision 310), then the example process 300 includes generating selection criterion trajectories (operation 314); comparing "N" . . . "N-n" trajectories (operation 316); and using the system identified DEST-APPR-STAR trajectory (operation 318).

After the DEST-APPR-STAR trajectory has been identified, either by the system or ATC/Ground Flight Control, the example process 300 includes generating a re-routing trajectory (e.g., both lateral and vertical) (operation 320); and system identification of a diversion point and control descent and stable landing (CD&SL) point (operation 322), wherein the diversion point is either system generated or an external specified diversion point (operation 324). The example process 300 further includes evaluating strategies for connecting the aircraft to the diversion point (operation 326) and stringing a new flight plan together that connects the aircraft to the diversion point and the CD&SL point (operation 328).

Figure 4:
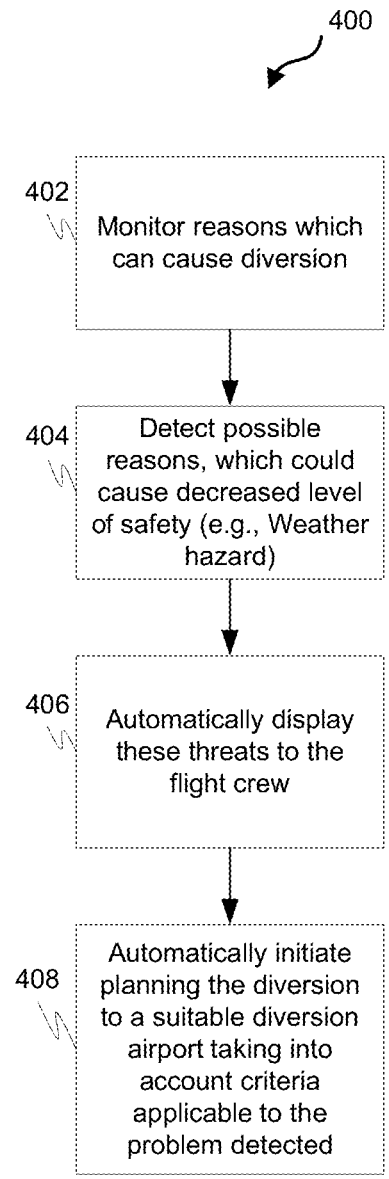
FIG. 4 is a process flow chart depicting an example process in an automatic diversion management system for automatic detection of diversion, in accordance with some embodiments.

FIG. 4 is a process flow chart depicting an example process 400 in an automatic diversion management system for automatic detection of diversion. The example process 400 includes monitoring for reasons which can cause diversion (operation 402) and detecting possible reasons for diversion when they occur (operation 404). Possible reasons for diversion could cause a decreased level of safety (e.g., weather hazard). The example process 400 further includes automatically displaying these threats (reasons for diversion) to the flight crew (operation 406) and automatically initiating planning a diversion to a suitable diversion airport while taking into account criteria applicable to the problem detected (operation 408).

Figure 5:
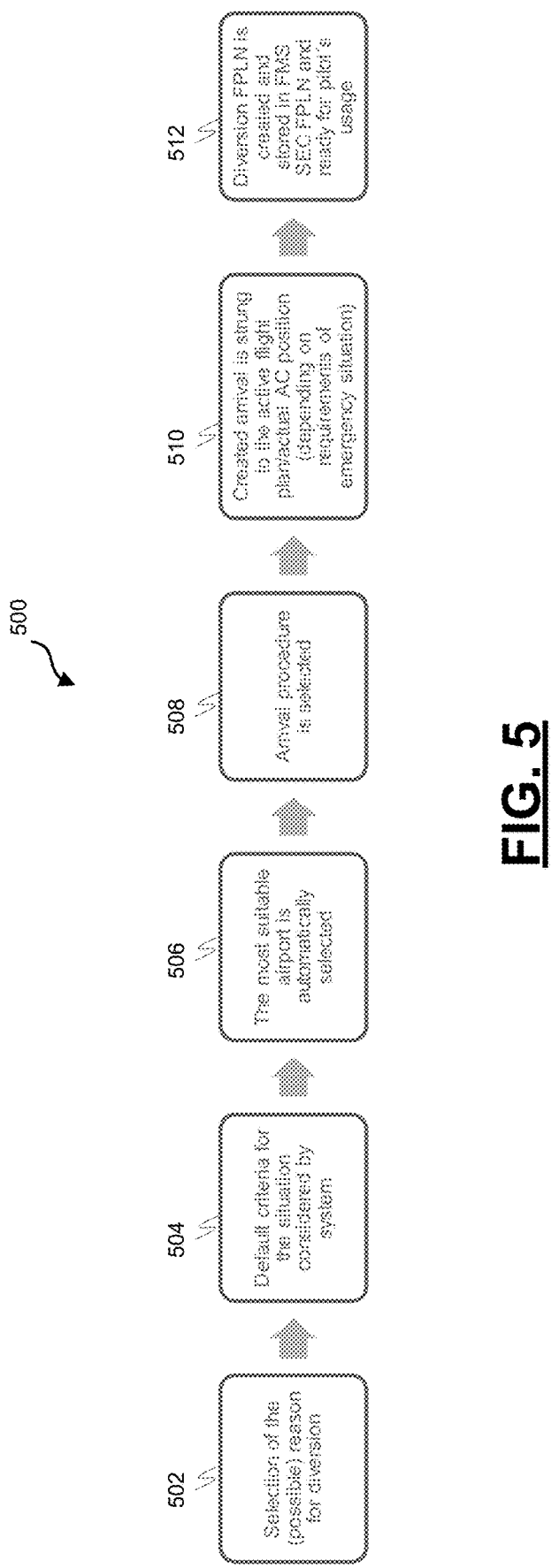
FIG. 5 is a process flow chart depicting an example process for strategic onboard diversion preparation for cases of emergency, in accordance with some embodiments.

FIG. 5 is a process flow chart depicting an example process 500 for strategic onboard diversion preparation for cases of emergency. The example process 500 includes selection of the (possible) reason for diversion (operation 502); identifying default criteria for selecting a diversion airport based on the reason for diversion (operation 504); automatically selecting the most suitable airport based on the selection criteria (operation 506); selecting an arrival procedure (operation 508); stringing the selected arrival procedure to the active flight plan/actual aircraft position (depending on requirements of emergency situation) (operation 510); and creating and storing the diversion flight plan in the FMS as a secondary flight plan that is ready for flight crew's usage (operation 512).

FIGS. 6A, 6B and 6C are process flow charts depicting example processes in an example diversion management system for automating the diversion approval process with ATC. FIG. 6A depicts an example process 600 for diversion approval when the diversion management system has identified a diversion reason that requires automatic submission to ATC for diversion approval and automatic activation once approval is received. In the example process 600, a depressurization failure has been detected (operation 602). The diversion management system initiates diversion flight plan creation (operation 604). The diversion management system completes the diversion flight plan and loads it as the secondary flight plan (operation 606). The diversion management system automatically sends a clearance request to ATC for use of the diversion flight plan (operation 608). ATC clearance is received by the diversion management system (operation 610). The diversion management system automatically activates the diversion flight plan (operation 612).

FIG. 6B depicts an example process 620 for diversion approval when the diversion management system has identified a diversion reason that does not require automatic submission to ATC for diversion approval or automatic activation. In the example process 620, the diversion management system has detected that an engine is out (operation 622). The diversion management system initiates diversion flight plan creation (operation 624). The diversion management system completes the diversion flight plan and loads it as the secondary flight plan (operation 626). The diversion management system sends a clearance request to ATC for use of the diversion flight plan upon request by the flight crew (operation 628). ATC clearance is received by the diversion management system (operation 630). The diversion management system activates the diversion flight plan upon request by the flight crew (operation 632).

FIG. 6C depicts an example process 640 for diversion approval when the flight crew has identified a diversion reason that does not require automatic submission to ATC for diversion approval or automatic activation. In the example process 640, the flight crew has detected that two engines are inoperative and notifies the diversion management system (operation 642). The diversion management system initiates diversion flight plan creation (operation 644). The diversion management system completes the diversion flight plan and loads it as the secondary flight (operation 646). The diversion management system sends a clearance request to ATC for use of the diversion flight plan upon request by the flight crew (operation 648). ATC clearance is received by the diversion management system (operation 650). The diversion management system activates the diversion flight plan upon request by the flight crew (operation 652).

Figure 7:
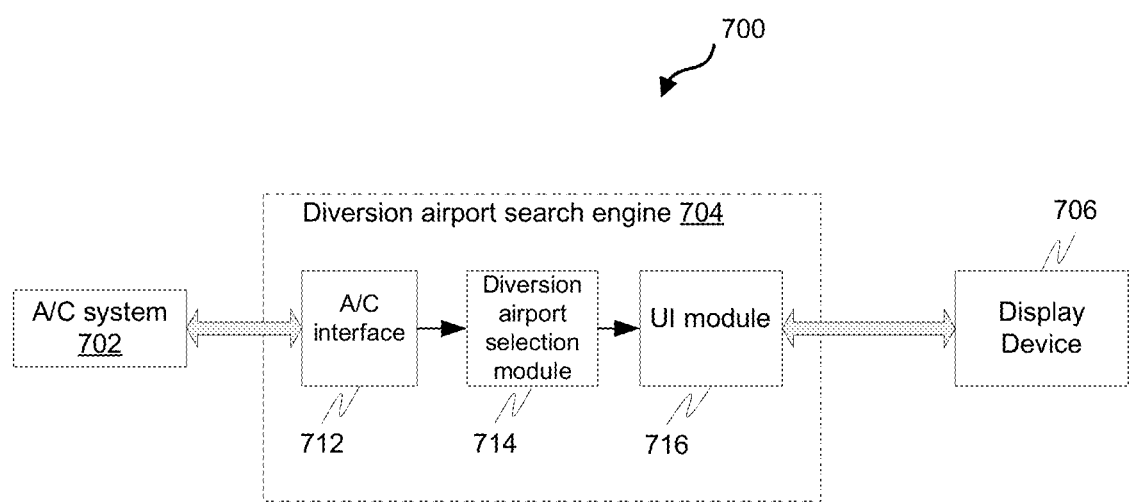
FIG. 7 is a block diagram depicting an example environment for providing an aircraft with the selection of a diversion airport using a ground-based diversion airport search engine to relieve flight crew work load when a need for diversion arises, in accordance with some embodiments.

FIG. 7 is a block diagram depicting an example environment 700 for providing an aircraft 702 with the selection of a diversion airport using a ground-based diversion airport search engine 704 to relieve flight crew work load when a need for diversion arises. The search engine can allow a ground based operator via a display device 706 to view information regarding potential diversion airports, select a diversion airport, and send the selection to the aircraft 702. The diversion airport search engine 704 includes an aircraft interface module 712, a diversion airport selection module 714, and a user interface module 716. The diversion airport search engine 704 comprises one or more processor configured by programming instructions on non-transient computer readable media to implement the aircraft interface module 712, diversion airport selection module 714, and user interface module 716.

The aircraft interface module 712 is configured to receive from the aircraft 702, the current aircraft flight path, type of diversion airport needed, and the aircraft type. When a diversion airport has been selected, the aircraft interface module 712 is configured to send details regarding a selected diversion airport to the aircraft 702.

The diversion airport selection module 714 is configured to select a plurality of suitable airports for diversion based on current aircraft flight path, type of diversion airport needed, type of aircraft and an evaluation of selection criterion. The selection criterion may include the cause of diversion, distance threshold that must not be exceeded for a potential diversion airport, available runway type at potential diversion airport, runway length at potential diversion airport, navigation aids at potential diversion airport, approach type at potential diversion airport, arrival procedure definition at potential diversion airport, route conflict or free route to potential diversion airport, and estimation of landing weight versus jettison gross weight at potential diversion airport.

The user interface module 716 is configured to display on a user interface (UI), on the display device 706, a map that includes the current aircraft flight plan and icons representative of all suitable airports for diversion. Each icon for a suitable airport on the UI is selectable by an operator to display information regarding the airport that is useful for selecting the most suitable airport for diversion. The user interface module 716 is also configured to receive a selection by an operator of a diversion airport.

The ground-based diversion airport search engine 704 may allow for a more thorough consideration of factors when selecting a diversion airport. The ground-based diversion airport search engine 704 may have access to up-to-date information (e.g., Notice to Airmen-NOTAMS), have access to actual weather information, allow for decreased flight crew workload, have access to more sources of data, and allow for consideration of current traffic.

The ground-based diversion airport search engine 704 may have access to multiple sources to collect relevant information. The ground-based diversion airport search engine 704 may have access to map data that may provide information such as the position of the airport, the position of the closest hospital, and the position of the closest hotel. The ground-based diversion airport search engine 704 may have access to more information regarding the possibility of the aircraft to land and take-off from the candidate diversion airport such as weight, pavement strength, runway width, and stands. The ground-based diversion airport search engine 704 may have access to weather forecast (e.g., METAR, TAF). The ground-based diversion airport search engine 704 may have access to airline preferences such as airline presence and contracted maintenance at the potential diversion airport. The ground-based diversion airport search engine 704 may have access to Notice to Airmen (NOTAM). The ground-based diversion airport search engine 704 may have access to an Aeronautical Information Publication (AIP), which may include runway length, landing systems available, pavement strength, rescue and fire fighting category, customs, fuel type available, oil type available, obstacle database, airport openings, air traffic service, and de-icing. The ground-based diversion airport search engine 704 may have access to the airport website which may provide information such as parking fees, landing fees, and repair costs.

In one example implementation, the ground-based diversion airport search engine 704 may include a selection of the type of alternate/diversion airport necessary (due to the reason for diversion). For an operating need, the ground-based diversion airport search engine 704 may provide alternatives such as ETOPS alternate airport, alternate airport for diversion from destination, alternate airport for weather at destination, alternate airport for fuel. For an emergency or safety reason, the ground-based diversion airport search engine 704 may provide alternatives for engine out, depressurization failure, and medical emergency. The ground-based diversion airport search engine 704 may provide alternatives for type of aircraft (e.g., consider characteristics and weights of the aircraft) or ability to manually enter weights of aircraft.

Figure 8:
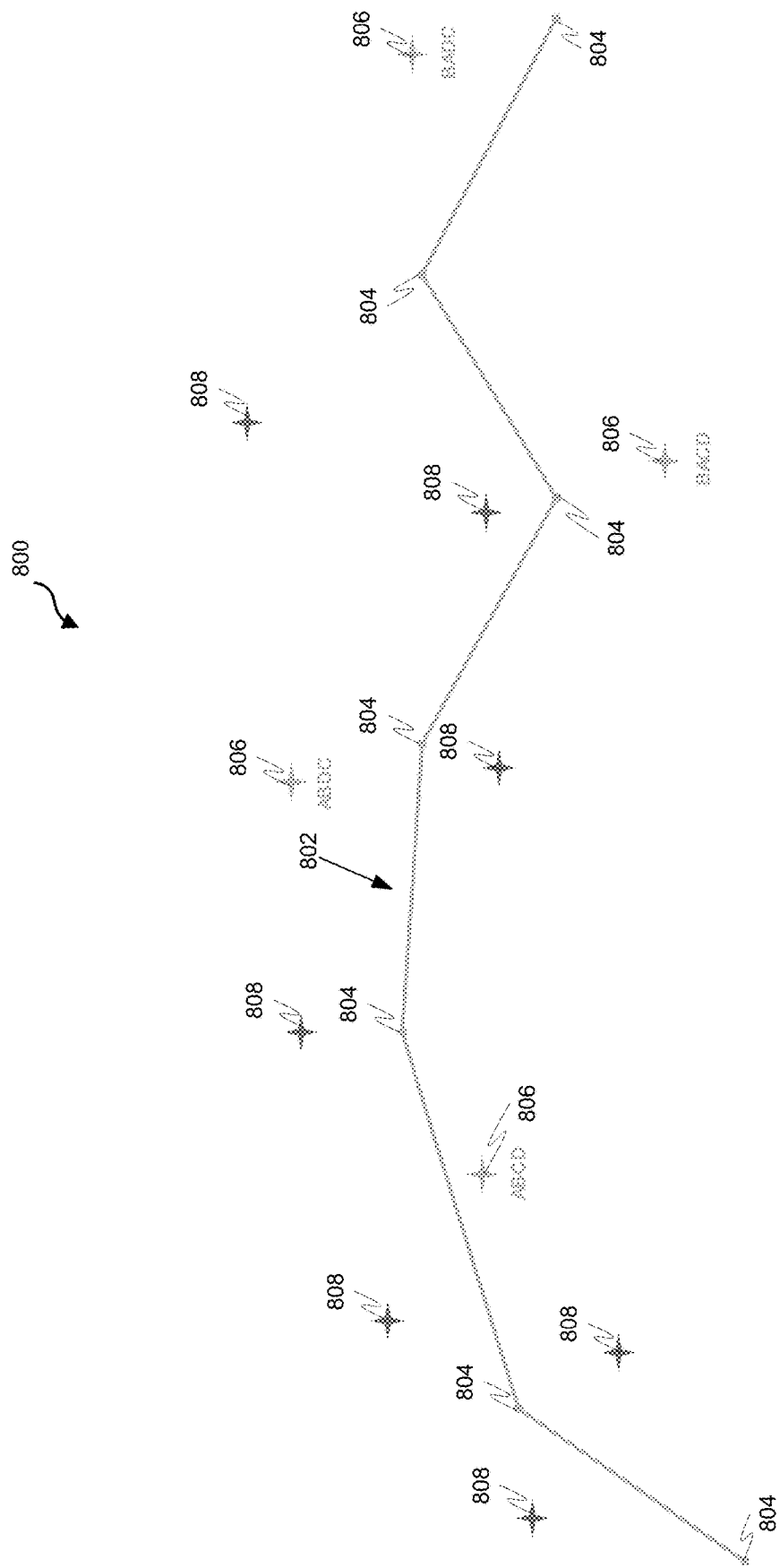
FIG. 8 is a diagram depicting an example user interface from an example ground-based diversion airport search engine, in accordance with some embodiments.

FIG. 8 is a diagram depicting an example user interface 800 from an example ground-based diversion airport search engine 704 that is displaying a flight plan 802, waypoints 804, and nearby airports, which include possible diversion airports 806 and airports 808 that cannot serve as possible diversion airports.

Figure 9:
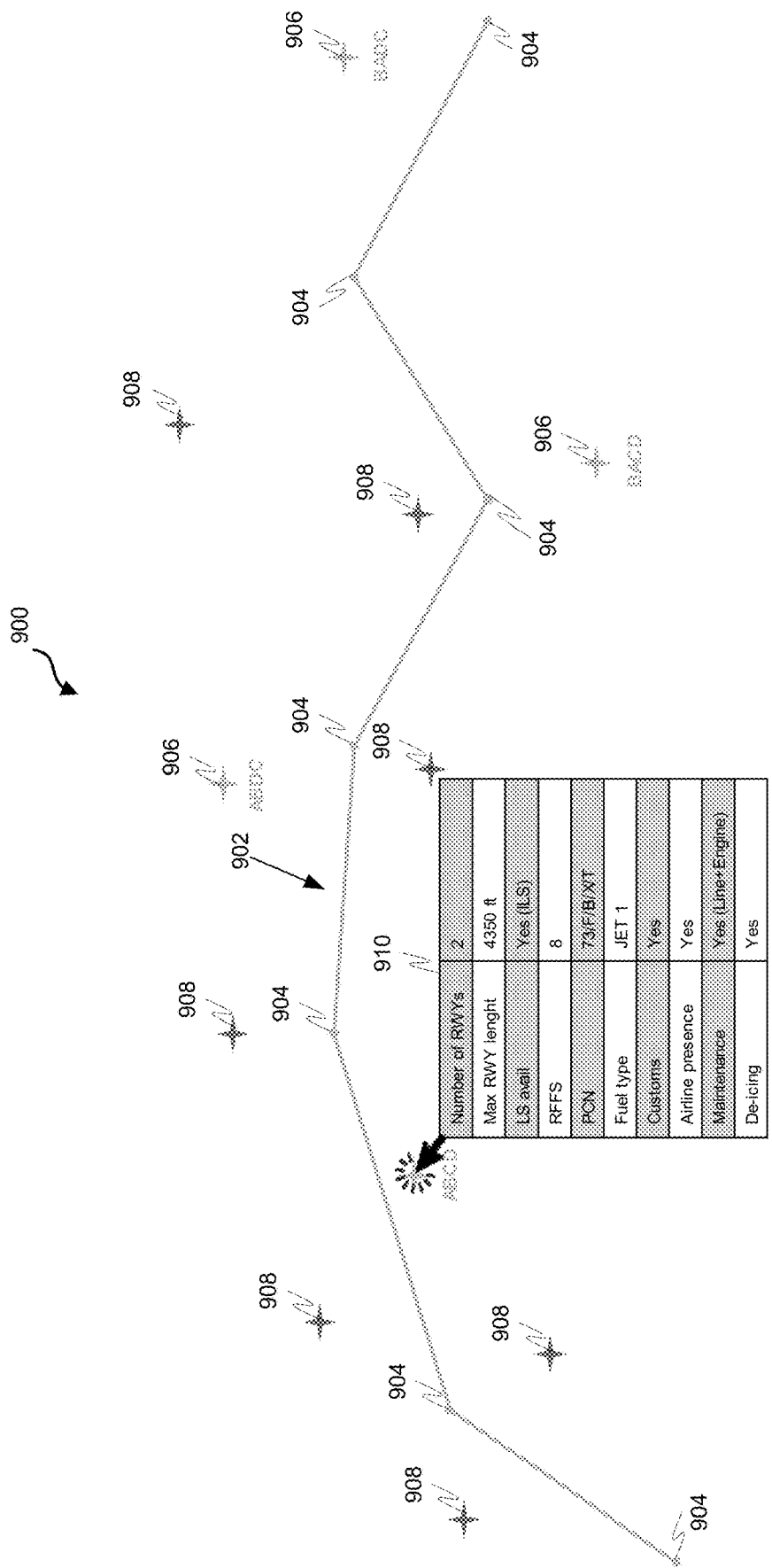
FIG. 9 is a diagram depicting an example user interface from an example ground-based diversion airport search engine, in accordance with some embodiments.

FIG. 9 is a diagram depicting an example user interface 900 from an example ground-based diversion airport search engine 704 that is displaying a flight plan, waypoints, nearby airports, and possible diversion airports. In this example user interface 900, a possible diversion airport ABCD has been selected and the user interface 900 displays information via chart 910 regarding the selected diversion airport ABCD.

Figure 10:
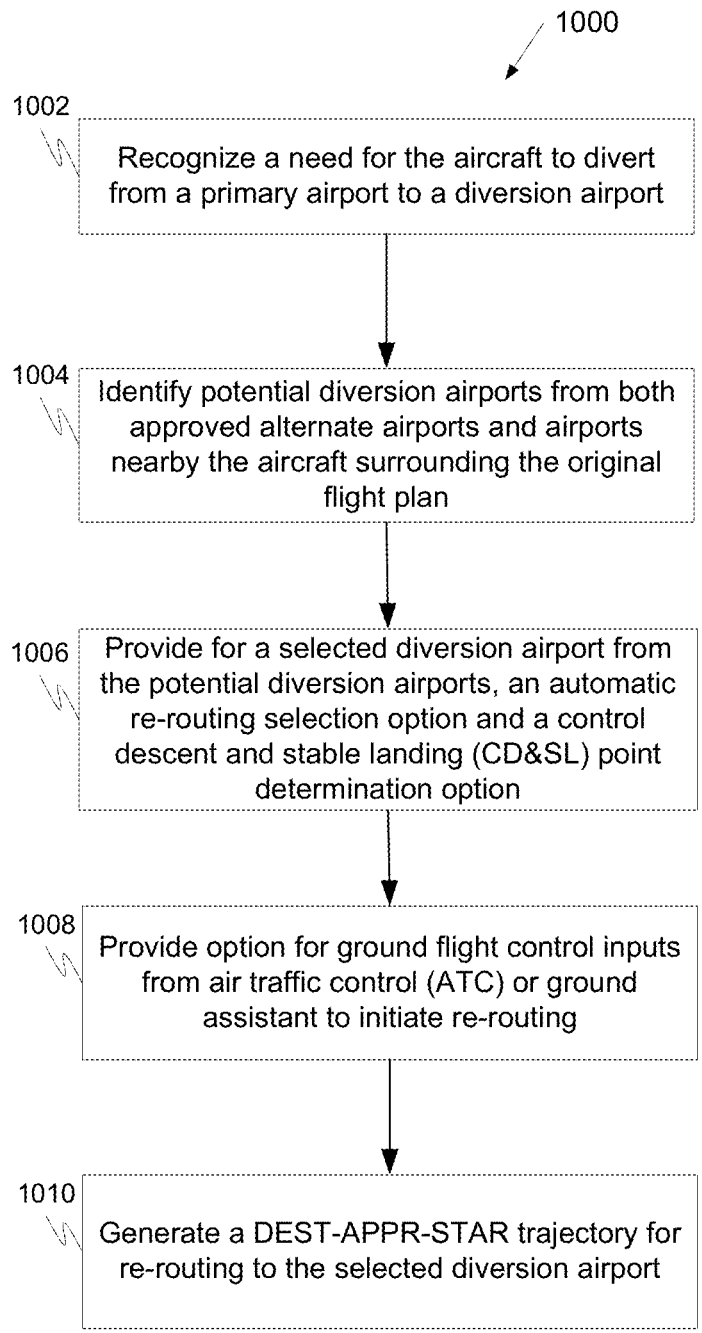
FIG. 10 is a process flow chart depicting an example processor-implemented process in an aircraft for automatic diversion management, in accordance with some embodiments.

FIG. 10 is a process flow chart depicting an example processor-implemented process 1000 in an aircraft for automatic diversion management. The order of operation within the process 1000 is not limited to the sequential execution as illustrated in the figure, but may be performed in one or more varying orders as applicable and in accordance with the present disclosure.

The example process 1000 includes recognizing, by a processor in the aircraft, a need for the aircraft to divert from a primary airport to a diversion airport (operation 1002). The need for diversion may be caused by one or more of a safety of flight condition, an operational condition, or a service related condition. Examples of safety of flight conditions include pilot incapacitation (especially for RCO/SPO), fire, smoke, major mechanical failure, natural disaster, and security. Examples of operational conditions include fuel (e.g., over burn or leak), ETOPS, weather at destination, ATC system constraint (e.g., required holding pattern), or runway obstruction. Examples of service related conditions include a medical need of a passenger or an unruly passenger.

The example process 1000 includes identifying, by the processor, potential diversion airports from both approved alternate airports and airports nearby the aircraft surrounding the original flight plan (operation 1004). The identifying potential diversion airports may include identifying, by the processor, selection criterion for selecting a potential diversion airport from the approved alternate airports and airports nearby the aircraft; determining, by the processor based on the selection criterion, weather and airport conditions, a DEST-APPR-STAR (destination, approach, standard terminal arrival route) for potential diversion airports; and storing, by the processor, the DEST-APPR-STAR for potential diversion airports for use by ground flight control in selecting a diversion airport. The selection criterion may include a plurality of: the cause of the diversion, distance threshold that must not be exceeded for a potential diversion airport, available runway type at potential diversion airport (such as parallel, cross, two opposite directions), runway length at potential diversion airport, navigation aids at potential diversion airport, approach type at potential diversion airport (precision approaches capabilities may be promoted to enable auto land), arrival procedure definition at potential diversion airport (closed-loop procedures may have primacy over open-loop procedures), route conflict or free route to potential diversion airport, and estimation of landing weight versus jettison gross weight at potential diversion airport.

The example process 1000 includes providing, by the processor for a selected diversion airport from the potential diversion airports, an automatic re-routing selection option and a control descent and stable landing (CD&SL) point determination option (operation 1006). The providing an automatic re-routing selection option and a CD&SL point determination option may include: identifying, by the processor upon selection of a CD&SL point determination option and automatic re-routing selection option, a CD&SL point to the selected diversion airport; and identifying aircraft to CD&SL connecting strategies. The identifying aircraft to CD&SL connecting strategies may include: generating a re-routing path from the aircraft current location to the identified CD&SL point; identifying a diversion point from the current flight path to the CD&SL point; and broadcasting the re-routing path.

The example process 1000 includes providing, by the processor, an option for ground flight control inputs from air traffic control (ATC) or ground assistant to initiate re-routing (operation 1008). The providing an option for ground flight control inputs from ATC or ground assistant to initiate re-routing may include: generating, responsive to ground control inputs, an ATC clearance request for a non-active flight plan that includes the aircraft to CD&SL connecting strategies to the selected diversion airport; activating, responsive to ground control inputs, a non-active flight plan for re-routing the aircraft to a selected diversion airport, wherein the non-active flight includes the non-active flight plan in the ATC clearance request or a non-active flight plan uploaded by the ATC; and enabling performance of the activated non-active flight plan to re-route the aircraft.

The example process 1000 also includes generating, by the processor, a DEST-APPR-STAR trajectory for re-routing to the selected diversion airport (operation 1010).

Described herein are apparatus, systems, techniques and articles for automatic diversion management. The apparatus, systems, techniques and articles provided herein can provide for automatic detection of the necessity to divert (e.g., technical failure, weather conditions used as trigger for diversion creation). The apparatus, systems, techniques and articles provided herein can provide for adjustment of diversion route depending on the diversion cause/threat—tactical re-routing. The apparatus, systems, techniques and articles provided herein can provide a cFMS (connected FMS)

solution where weather information, chart data, NOTAM, etc. from an external client could be used during the processing of the diversion route. The apparatus, systems, techniques and articles provided herein can provide support for RCO/SPO in case of on-board emergency (e.g., automatic detection, automatic resolution and activation of diversion). The apparatus, systems, techniques and articles provided herein can provide for automatization of the process to receive ATC clearance to support RCO/SPO (e.g., after the diversion is created, the request is automatically sent to ATC). The apparatus, systems, techniques and articles provided herein can provide tactical and strategic support for diversion creation from ground by datalink (AOC)—using cFMS solution. The apparatus, systems, techniques and articles provided herein can provide one click strategic diversion planning as preparation for emergency situations. The apparatus, systems, techniques and articles provided herein can provide a new application that enables easy search and selection of an optimal diversion airport during the flight preparation phase. The apparatus, systems, techniques and articles provided herein can provide a system wherein the overall costs of diversion for different possibilities are taken into account.

In one embodiment, an automatic diversion management system on-board an aircraft is provided. The diversion management system comprises one or more processors configured by programming instructions on non-transient computer readable media. The diversion management system is configured to automatically detect a need for the aircraft to divert from a primary airport to a diversion airport; automatically initiate diversion planning to a suitable diversion airport responsive to detecting conditions that can cause a need for diversion; automatically create a diversion flight plan; automatically send a clearance request to air traffic control (ATC) for a first type of conditions causing a need for diversion and send a clearance request to ATC, responsive to flight crew action, for a second type of conditions causing a need for diversion; and automatically activate the diversion flight plan after receipt of ATC clearance for the first type of conditions causing a need for diversion and activate the diversion flight plan, responsive to flight crew action, for the second type of conditions causing a need for diversion.

In one embodiment, to automatically detect, the system is configured to: monitor for conditions that can cause diversion; detect conditions that can cause a threat and a need for diversion; and display detected threats to the flight crew.

In one embodiment, to perform diversion planning, the system is configured to: identify potential diversion airports from both approved alternate airports and airports nearby the aircraft surrounding the original flight plan; identify selection criterion for selecting a diversion airport from the approved alternate airports and airports nearby the aircraft; and automatically select the most suitable diversion airport using the selection criterion.

In one embodiment, the selection criterion comprises a plurality of: the cause of diversion, distance threshold that must not be exceeded for a potential diversion airport, available runway type at potential diversion airport (such as parallel, cross, two opposite directions), runway length at potential diversion airport, navigation aids at potential diversion airport, approach type at potential diversion airport, arrival procedure definition at potential diversion airport, route conflict or free route to potential diversion airport, and estimation of landing weight versus jettison gross weight at potential diversion airport.

In one embodiment, to create a diversion flight plan the system is configured to: determine, based on weather and airport conditions, a DEST-APPR-STAR (destination, approach, standard terminal arrival route) for the selected diversion airport; identify a control descent and stable landing (CD&SL) point to the selected diversion airport; generate a re-routing path from the aircraft current location to the identified CD&SL point; identify a diversion point from the current flight path to the CD&SL point; connect the CD&SL point, re-routing path, and diversion point to the active flight plan; and automatically store the diversion flight plan as a secondary flight plan ready for flight crew usage.

In one embodiment, the first type of conditions causing a need for diversion comprises a safety of flight condition and the second type of conditions causing a need for diversion comprises an operational condition or a service related condition.

In one embodiment, the safety of flight condition is caused by one or more of: pilot incapacitation in reduced crew or single pilot operations, fire and/or smoke, major mechanical failure, natural disaster, or security; the operational condition is caused by one or more of: fuel over burn or fuel leak, extended operations (ETOPS), weather at destination, ATC system constraint including holding, or runway obstruction; and the service related condition is caused by one or more of medical need or an unruly passenger.

In another embodiment, a processor-implemented method in an aircraft for automatic diversion management is provided. The method comprises: recognizing, by a processor in the aircraft, a need for the aircraft to divert from a primary airport to a diversion airport; identifying, by the processor, potential diversion airports from both approved alternate airports and airports nearby the aircraft surrounding the original flight plan; providing, by the processor for a selected diversion airport from the potential diversion airports, an automatic re-routing selection option and a control descent and stable landing (CD&SL) point determination option; providing, by the processor, an option for ground flight control inputs from air traffic control (ATC) or a ground assistant to initiate re-routing; and generating, by the processor, a DEST-APPR-STAR (destination, approach, standard arrival route) trajectory for re-routing to the selected diversion airport.

In one embodiment, the identifying potential diversion airports comprises: identifying, by the processor, selection criterion for selecting a potential diversion airport from the approved alternate airports and airports nearby the aircraft; determining, by the processor based on the selection criterion, weather and airport conditions, a DEST-APPR-STAR (destination, approach, standard terminal arrival route) for potential diversion airports; and storing, by the processor, the DEST-APPR-STAR for potential diversion airports for use by ground flight control in selecting a diversion airport.

In one embodiment, the selection criterion comprises a plurality of: the cause of diversion, distance threshold that must not be exceeded for a potential diversion airport, available runway type at potential diversion airport (such as parallel, cross, two opposite directions), runway length at potential diversion airport, navigation aids at potential diversion airport, approach type at potential diversion airport, arrival procedure definition at potential diversion airport, route conflict or free route to potential diversion airport, and estimation of landing weight versus jettison gross weight at potential diversion airport.

In one embodiment, the providing an automatic re-routing selection option and a CD&SL point determination option comprises: identifying, by the processor upon selection of a CD&SL point determination option and automatic re-routing selection option, a CD&SL point to the selected diversion airport; and identifying aircraft to CD&SL connecting strategies.

In one embodiment, the identifying aircraft to CD&SL connecting strategies comprises: generating a re-routing path from the aircraft current location to the identified CD&SL point; identifying a diversion point from the current flight path to the CD&SL point; and broadcasting the re-routing path.

In one embodiment, the providing an option for ground flight control inputs from ATC or ground assistant to initiate re-routing comprises: generating, responsive to ground control inputs, an ATC clearance request for a non-active flight plan that includes the aircraft to CD&SL connecting strategies to the selected diversion airport; activating, responsive to ground control inputs, a non-active flight plan for re-routing the aircraft to a selected diversion airport, wherein the non-active flight comprises the non-active flight plan in the ATC clearance request or a non-active flight plan uploaded by the ATC; and enabling performance of the activated non-active flight plan to re-route the aircraft.

In one embodiment, the need for diversion comprises one or more of a safety of flight condition, an operational condition, or a service related condition.

In one embodiment, the safety of flight condition is caused by one or more of: pilot incapacitation in reduced crew or single pilot operations, fire and/or smoke, major mechanical failure, natural disaster, or security; the operational condition is caused by one or more of: fuel over burn or fuel leak, extended operations (ETOPS), weather at destination, ATC system constraint including holding, or runway obstruction; and the service related condition is caused by one or more of medical need or an unruly passenger.

In another embodiment, a diversion management system on-board an aircraft is provided. The diversion management system is configured to: identify potential diversion airports when a need for diversion from a primary airport to a diversion airport has been recognized; provide, for a selected diversion airport from the potential diversion airports, an automatic re-routing selection option and a control descent and stable landing (CD&SL) point determination option; provide an option for ground flight control inputs from air traffic control (ATC) or a ground assistant to initiate re-routing; and generate a DEST-APPR-STAR (destination, approach, standard terminal arrival route) trajectory for re-routing to the selected diversion airport.

In one embodiment, to identify potential diversion airports, the system is configured to: identify selection criterion for selecting a potential diversion airport from approved alternate airports and airports nearby the aircraft; determine, based on the selection criterion, weather and airport conditions, a DEST-APPR-STAR for potential diversion airports; and store the DEST-APPR-STAR for potential diversion airports for use by ground flight control in selecting a diversion airport.

In one embodiment, to provide an automatic re-routing selection option and a CD&SL point determination option, the system is configured to: identify, upon selection of a CD&SL point determination option and automatic re-routing selection option, a CD&SL point to the selected diversion airport; and identify aircraft to CD&SL connecting strategies.

In one embodiment, to identify aircraft to CD&SL connecting strategies, the system is configured to: generate a re-routing path from the aircraft current location to the identified CD&SL point; identify a diversion point from the current flight path to the CD&SL point; and broadcast the re-routing path.

In one embodiment, to provide an option for ground flight control inputs from air traffic control (ATC) or a ground assistant to initiate re-routing, the system is configured to: generate, responsive to ground control inputs, an ATC clearance request for a non-active flight plan that includes the aircraft to CD&SL connecting strategies to the selected diversion airport; activate, responsive to ground control inputs, a non-active flight plan for re-routing the aircraft to a selected diversion airport, wherein the non-active flight comprises the non-active flight plan in the ATC clearance request or a non-active flight plan uploaded by the ATC; and enable performance of the activated non-active flight plan to re-route the aircraft.

In another embodiment, a diversion airport search engine for use off-board an aircraft is provided. The search engine is configured to: receive a selection of a type of diversion airport needed and type of aircraft; select a plurality of suitable airports for diversion based on a current aircraft flight path, type of diversion airport needed, type of aircraft and an evaluation of selection criterion; and display on a user interface (UI) a map that includes the current aircraft flight plan and icons representative of all suitable airports for diversion, wherein each icon for a suitable airport is selectable to display information regarding the airport that is useful for selecting the most suitable airport for diversion.

In one embodiment, the selection criterion includes a plurality of: the cause of diversion, distance threshold that must not be exceeded for a potential diversion airport, available runway type at potential diversion airport, runway length at potential diversion airport, navigation aids at potential diversion airport, approach type at potential diversion airport, arrival procedure definition at potential diversion airport, route conflict or free route to potential diversion airport, and estimation of landing weight versus jettison gross weight at potential diversion airport.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An automatic diversion management system on-board an aircraft, the diversion management system comprising one or more processors configured by programming instructions on non-transitory computer readable media, the diversion management system configured to:
   monitor aircraft systems during flight for conditions that can lead to a flight crew member initiated diversion to a diversion airport;
   detect, based on monitoring aircraft systems, a potential threat that can cause a need for flight crew member initiated diversion from a primary airport to the diversion airport;
   signal an aircraft display device to display the potential threat for viewing by a flight crew member;
   identify selection criterion for selecting the diversion airport;
   automatically select the diversion airport using the selection criterion;
   determine, based on weather and airport conditions, a DEST-APPR-STAR (destination, approach, standard terminal arrival route) for the selected diversion airport;
   identify a control descent and stable landing (CD&SL) point to the selected diversion airport, wherein the CD&SL point is a closest point backward from the diversion airport where the aircraft should initiate descent;
   generate a re-routing path from a current aircraft location to the identified CD&SL point;
   identify a diversion point from the current flight path to the CD&SL point, wherein the diversion point is a point at which the aircraft would have to divert from an active flight plan for safe landing at the diversion airport;
   connect the CD&SL point, re-routing path, and diversion point to the active flight plan;
   automatically create the flight crew member initiated diversion flight plan based on connecting the CD&SL point, re-routing path, and diversion point to the active flight plan;
   automatically store the automatically created flight crew member initiated diversion flight plan as a secondary flight plan ready for flight crew usage;
   generate a clearance request to ATC for clearance to implement the automatically created flight crew member initiated diversion flight plan;
   send, responsive to flight crew approval, the generated clearance request for the automatically created flight crew member initiated diversion flight plan to ATC for clearance; and
   activate the automatically created flight crew member initiated diversion flight plan responsive to flight crew approval to activate;
   wherein the aircraft is operated in accordance with the activated diversion flight plan.

2. The automatic diversion management system of claim 1, wherein the system is further configured to: monitor aircraft systems during flight for other conditions that can lead to automatic diversion without flight crew intervention to a diversion airport;

detect, based on monitoring aircraft systems, a potential threat that can cause a need for automatic diversion from a primary airport to a diversion airport without flight crew intervention;

automatically create an automatic diversion flight plan after detecting a need for automatic diversion without flight crew intervention;

automatically send a clearance request to ATC for clearance to implement the automatic diversion flight plan;

automatically activate the automatic diversion flight plan after receipt of ATC clearance; and cause the aircraft to operate in accordance with the activated automatic diversion flight plan.

3. The automatic diversion management system of claim 2, wherein to create an automatic diversion flight plan the system is configured to:

determine, based on weather and airport conditions, a DEST-APPR-STAR (destination, approach, standard terminal arrival route) for a selected diversion airport for the automatic diversion flight plan;

identify a control descent and stable landing (CD&SL) point to the selected diversion airport for the automatic diversion flight plan;

generate a re-routing path from the current aircraft location to the identified CD&SL point;

identify a diversion point from the current flight path to the CD&SL point;

connect the CD&SL point, re-routing path, and diversion point to the active flight plan; and automatically store the automatic diversion flight plan.

4. The automatic diversion management system of claim 2, wherein the potential threat that can cause a need for automatic diversion comprises a safety of flight condition and the potential threat that can cause a need for flight crew member initiated diversion comprises an operational condition or a service related condition.

5. The automatic diversion management system of claim 4, wherein:

the safety of flight condition is caused by one or more of: pilot incapacitation in reduced crew or single pilot operations, fire and/or smoke, major mechanical failure, natural disaster, or security;

the operational condition is caused by one or more of: fuel over burn or fuel leak, extended operations (ETOPS), weather at destination, ATC system constraint including holding, or runway obstruction; and the service related condition is caused by one or more of medical need or an unruly passenger.

6. The automatic diversion management system of claim 1, wherein, to automatically select the diversion airport, the system is configured to:

identify potential diversion airports from both approved alternate airports and airports nearby the aircraft surrounding an original flight plan; and automatically select a most suitable diversion airport using the selection criterion.

7. The automatic diversion management system of claim 1, wherein the selection criterion comprises a plurality of: the cause of diversion, distance threshold that must not be exceeded for a potential diversion airport, available runway type at potential diversion airport, runway length at potential diversion airport, navigation aids at potential diversion airport, approach type at potential diversion airport, arrival procedure definition at potential diversion airport, route conflict or free route to potential diversion airport, and estimation of landing weight versus jettison gross weight at potential diversion airport.

8. The automatic diversion management system of claim 1, wherein the system is further configured to:

receive ground flight control inputs from ground flight control personnel to initiate creating a ground-flight-control-initiated diversion flight plan;

create the ground-flight-control-initiated diversion flight plan after receiving the ground flight control inputs;

generate a clearance request to ATC for clearance to implement the ground-flight-control-initiated diversion flight plan;

send, responsive to approval from the ground flight control personnel, the generated clearance request to ATC for clearance; and activate the ground-flight-control-initiated diversion flight plan responsive to flight crew approval to activate;

wherein the aircraft is operated in accordance with the activated ground-flight-control-initiated diversion flight plan.

9. A processor-implemented method in an aircraft for automatic diversion management, the method comprising:

monitoring, by a processor in the aircraft, aircraft systems during flight for conditions that can lead to a flight crew member initiated diversion to a diversion airport;

detecting, by the processor based on monitoring aircraft systems, a potential threat that can cause a need for flight crew member initiated diversion from a primary airport to the diversion airport;

signaling, by the processor, an aircraft display device to display the potential threat for viewing by a flight crew member;

identifying, by the processor, selection criterion for selecting the diversion airport;

selecting the diversion airport using the selection criterion;

determining, based on weather and airport conditions, a DEST-APPR-STAR (destination, approach, standard terminal arrival route) for the selected diversion airport;

identifying a control descent and stable landing (CD&SL) point to the selected diversion airport, wherein the CD&SL point is a closest point backward from the diversion airport where the aircraft should initiate descent;

generating a re-routing path from a current aircraft location to the identified CD&SL point;

identifying a diversion point from the current flight path to the CD&SL point, wherein the diversion point is a point at which the aircraft would have to divert from an active flight plan for safe landing at the diversion airport;

connecting the CD&SL point, re-routing path, and diversion point to the active flight plan;

automatically creating the flight crew member initiated diversion flight plan based on connecting the CD&SL point, re-routing path, and diversion point to the active flight plan;

automatically storing the automatically created flight crew member initiated diversion flight plan as a secondary flight plan ready for flight crew usage;

generating a clearance request to ATC for clearance to implement the automatically created flight crew member initiated diversion flight plan;

sending, responsive to flight crew approval, the generated clearance request for the automatically created flight crew member initiated diversion flight plan to ATC for clearance; and activating the automatically created flight crew member initiated diversion flight plan responsive to flight crew approval to activate;

wherein the aircraft is operated in accordance with the activated diversion flight plan.

10. The method of claim 9, wherein the selecting the diversion airport comprises:

identifying, by the processor, potential diversion airports from both approved alternate airports and airports nearby the aircraft surrounding an original flight plan; and automatically selecting a most suitable diversion airport using the selection criterion.

11. The method of claim 9, wherein the selection criterion comprises a plurality of: the cause of diversion, distance threshold that must not be exceeded for a potential diversion airport, available runway type at potential diversion airport, runway length at potential diversion airport, navigation aids at potential diversion airport, approach type at potential diversion airport, arrival procedure definition at potential diversion airport, route conflict or free route to potential diversion airport, and estimation of landing weight versus jettison gross weight at potential diversion airport.

12. The method of claim 9, wherein the need for diversion comprises one or more of a safety of flight condition, an operational condition, or a service related condition.

13. The method of claim 12, wherein:

the safety of flight condition is caused by one or more of: pilot incapacitation in reduced crew or single pilot operations, fire and/or smoke, major mechanical failure, natural disaster, or security;

the operational condition is caused by one or more of: fuel over burn or fuel leak, extended operations (ETOPS), weather at destination, ATC system constraint including holding, or runway obstruction; and the service related condition is caused by one or more of medical need or an unruly passenger.

14. A non-transitory computer readable medium encoded with programming instructions configurable to cause a processor in an aircraft to perform a method for automatic diversion management, the method comprising:

monitoring, by a processor in the aircraft, aircraft systems during flight for conditions that can lead to a flight crew member initiated diversion to a diversion airport;

detecting, by the processor based on monitoring aircraft systems, a potential threat that can cause a need for flight crew member initiated diversion from a primary airport to the diversion airport;

signaling, by the processor, an aircraft display device to display the potential threat for viewing by a flight crew member;

identifying selection criterion for selecting the diversion airport;

identifying, by the processor, selection criterion for selecting the diversion airport;

selecting the diversion airport using the selection criterion;

determining, based on weather and airport conditions, a DEST-APPR-STAR (destination, approach, standard terminal arrival route) for the selected diversion airport;

identifying a control descent and stable landing (CD&SL) point to the selected diversion airport, wherein the CD&SL point is a closest point backward from the diversion airport where the aircraft should initiate descent;

generating a re-routing path from a current aircraft location to the identified CD&SL point;

identifying a diversion point from the current flight path to the CD&SL point, wherein the diversion point is a point at which the aircraft would have to divert from an active flight plan for safe landing at the diversion airport;

connecting the CD&SL point, re-routing path, and diversion point to the active flight plan;

automatically creating the flight crew member initiated diversion flight plan based on connecting the CD&SL point, re-routing path, and diversion point to the active flight plan;

automatically storing the automatically created flight crew member initiated diversion flight plan as a secondary flight plan ready for flight crew usage;

generating a clearance request to ATC for clearance to implement the automatically created flight crew member initiated diversion flight plan;

sending, responsive to flight crew approval, the generated clearance request for the automatically created flight crew member initiated diversion flight plan to ATC for clearance; and activating the automatically created flight crew member initiated diversion flight plan responsive to flight crew approval to activate;

wherein the aircraft is operated in accordance with the activated diversion flight plan.

15. The non-transitory computer readable medium of claim 14, wherein the selecting the diversion airport comprises:

identifying, by the processor, potential diversion airports from both approved alternate airports and airports nearby the aircraft surrounding an original flight plan; and automatically selecting a most suitable diversion airport using the selection criterion.

16. The non-transitory computer readable medium of claim 14, wherein the selection criterion comprises a plurality of: the cause of diversion, distance threshold that must not be exceeded for a potential diversion airport, available runway type at potential diversion airport, runway length at potential diversion airport, navigation aids at potential diversion airport, approach type at potential diversion airport, arrival procedure definition at potential diversion airport, route conflict or free route to potential diversion airport, and estimation of landing weight versus jettison gross weight at potential diversion airport.

17. The non-transitory computer readable medium of claim 14, wherein the need for diversion comprises one or more of a safety of flight condition, an operational condition, or a service related condition.

18. The non-transitory computer readable medium of claim 14, wherein:

the safety of flight condition is caused by one or more of: pilot incapacitation in reduced crew or single pilot operations, fire and/or smoke, major mechanical failure, natural disaster, or security;

the operational condition is caused by one or more of: fuel over burn or fuel leak, extended operations (ETOPS), weather at destination, ATC system constraint including holding, or runway obstruction; and the service related condition is caused by one or more of medical need or an unruly passenger.

* * * * *